United States Patent [19]

Kaneko et al.

[11] Patent Number: 5,536,818
[45] Date of Patent: Jul. 16, 1996

[54] DICHROIC AZO DYE, LIQUID CRYSTAL COMPOSITION CONTAINING THE SAME, AND LIQUID CRYSTAL ELEMENT USING THE COMPOSITION

[75] Inventors: Masaharu Kaneko; Hisayo Ishio, both of Kanagawa, Japan

[73] Assignee: Mitsubishi Chemical Corporation, Tokyo, Japan

[21] Appl. No.: 336,101

[22] Filed: Nov. 4, 1994

[30] Foreign Application Priority Data

Nov. 4, 1993 [JP] Japan .................................. 5-275702
Jun. 21, 1994 [JP] Japan .................................. 6-139026

[51] Int. Cl.$^6$ .............................. C09K 3/34; G02F 1/13
[52] U.S. Cl. .............. 534/577; 252/299.01; 252/299.65; 252/299.66; 359/103; 534/689; 534/755; 534/760; 534/796; 534/805; 534/808; 534/813; 534/825
[58] Field of Search ..................... 534/805, 808, 534/813, 825, 577, 689, 755, 760, 796; 252/299.01, 299.66, 299.65; 359/103

[56] References Cited

U.S. PATENT DOCUMENTS

| | | | |
|---|---|---|---|
| 4,519,935 | 5/1985 | Claussen | 534/825 X |
| 4,600,527 | 7/1986 | Imazeki et al. | 534/577 X |
| 4,610,803 | 9/1986 | Claussen | 252/299.01 |
| 4,770,809 | 9/1988 | Heidenreich et al. | 534/577 X |

*Primary Examiner*—Fiona T. Powers
*Attorney, Agent, or Firm*—Sughrue, Mion, Zinn, Macpeak & Seas

[57] ABSTRACT

A dichroic dye represented by the formula (I) or (II):

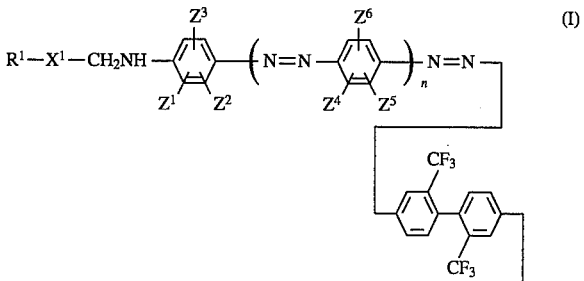

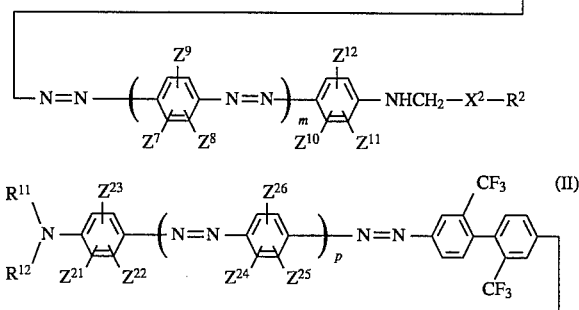

wherein the substituents are as described in the specification. The dichroic dyes (I) and (II) exhibit excellent dichroism and can be prepared from 2,2'-ditrifluoromethylbenzidine having no toxicity, such as mutagenicity.

17 Claims, 1 Drawing Sheet

DICHROIC AZO DYE, LIQUID CRYSTAL COMPOSITION CONTAINING THE SAME, AND LIQUID CRYSTAL ELEMENT USING THE COMPOSITION

FIELD OF THE INVENTION

This invention relates to a novel dichroic azo dye, a liquid crystal composition containing the same, and a liquid crystal element using the liquid crystal composition.

BACKGROUND OF THE INVENTION

Various liquid crystal display modes as well as a TN (twisted nematic) mode and an STN (super twisted nematic) mode have hitherto been proposed. In particular, a GH (guest-host) display system in which a dichroic dye is used in a dissolved state has been spreading as a display panel in automobiles, and the like with its wide angle of vision being taken advantage of.

Dichroic dyes to be used in a GH mode are required to have excellent dichroism, solubility in liquid crystal compounds, light resistance, and coloring power.

Azo dyes having a biphenyl skeleton exhibit a high absorption coefficient (coloring power). They can be prepared at low cost because an azo structure can be introduced on each side of the biphenyl skeleton simultaneously. Further, azo dyes having a long molecular length sufficient for use as a dye for liquid crystals can be obtained with ease. Despite these advantages, these azo dyes have been limited in both production and application due to high toxicity (carcinogenicity and mutagenicity) of the starting benzidine compounds.

U.S. Pat. No. 4,610,803 discloses various dichroic dyes having an azo group on each side of a biphenyl skeleton, but neither does it have mention of specific examples of dyes synthesized from 2,2'-ditrifluoromethylbenzidine used in the present invention nor does it refer to safety in production of such dyes. Moreover, although the above patent covers over a broad range of compounds, the specific examples shown are limited to those dyes synthesized by using phenolic coupling components without revealing the characteristics, e.g., dichroism, of dichroic dyes obtained by using alkylaniline type coupling components, which are typical coupling components other than the phenolic ones.

SUMMARY OF THE INVENTION

An object of the present invention is to provide a dichroic dye which exhibits excellent dichroism and which can be prepared with safety.

Another object of the present invention is to provide a liquid crystal composition containing the above dichroic dye.

A further object of the present invention is to provide a liquid crystal element using the above liquid crystal composition.

As a result of extensive investigations into dichroic azo dyes, they have found that 2,2'-ditrifluoromethylbenzidine has no carcinogenicity or mutagenicity unlike the other benzidine compounds and that a novel azo dye having excellent dichroism can be obtained safely where starting with this benzidine compound and an NH-methylene type coupling component or an aniline coupling component.

The present invention relates to a dichroic dye represented by formula (I):

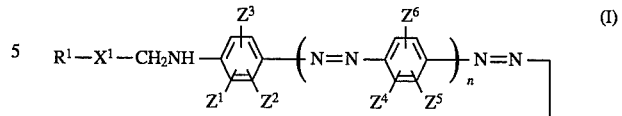

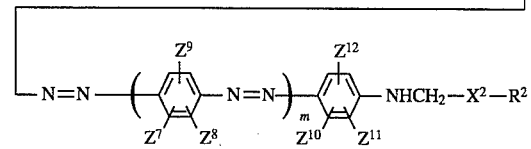

wherein $R^1$ and $R^2$ each represent a hydrogen atom or a nonionic substituent; $X^1$ and $X^2$ each represent

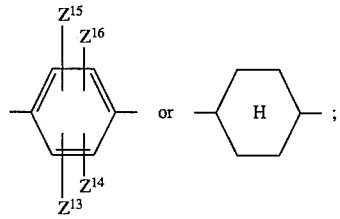

$Z^1, Z^2, Z^3, Z^4, Z^5, Z^6, Z^7, Z^8, Z^9, Z^{10}, Z^{11}, Z^{12}, Z^{13}, Z^{14}, Z^{15}$, and $Z^{16}$ each represent a hydrogen atom, a halogen atom, a methyl group or a methoxy group; $Z^1$ and $Z^2$, $Z^4$ and $Z^5$, $Z^7$ and $Z^8$, $Z^{10}$ and $Z^{11}$, and $Z^{13}$ and $Z^{14}$ may be connected to each other to form an aliphatic ring, an aromatic ring or a nitrogen-containing aromatic ring; and n and m each represent 0, 1 or 2.

The present invention also relates to a dichroic dye represented by formula (II):

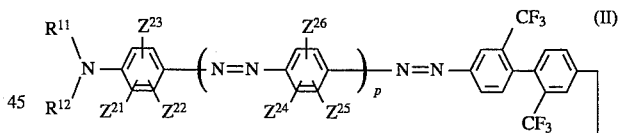

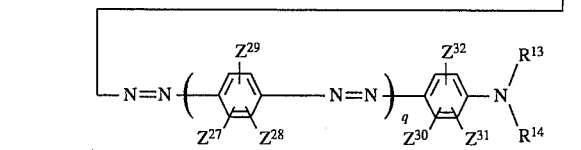

wherein $R^{11}, R^{12}, R^{13}$, and $R^{14}$ each represent a hydrogen atom, an alkyl group, an alkoxyalkyl group, a substituted or unsubstituted aralkyl group or a fluoroalkyl-substituted alkyl group, provided that a compound in which $R^{11}$ is a hydrogen atom and $R^{12}$ is a substituted or unsubstituted aralkyl group and a compound in which $R^{13}$ is a hydrogen atom and $R^{14}$ is a substituted or unsubstituted aralkyl group are excluded; $R^{11}$ and $R^{12}$, or $R^{13}$ and $R^{14}$ and may be connected to each other to form a nitrogen-containing aliphatic ring; $Z^{21}, Z^{22}, Z^{23}, Z^{24}, Z^{25}, Z^{26}, Z^{27}, Z^{28}, Z^{29}, Z^{30}, Z^{31}$, and $Z^{32}$ each represent a hydrogen atom, a halogen atom, a methyl group or a methoxy group; $Z^{21}$ and $Z^{22}$, $Z^{24}$ and $Z^{25}$, $Z^{27}$ and $Z^{28}$, or $Z^{30}$ and $Z^{31}$ may be connected to each other to form an aliphatic ring, an aromatic ring or a nitrogen-containing aromatic ring; $R^{11}$ and $Z^{23}$, $R^{12}$, and $Z^{21}$, $R^{13}$ and $Z^{32}$, or $R^{14}$ and $Z^{31}$ and may be connected to each other to form a nitrogen-containing aliphatic ring; and p and q each represent 0, 1 or 2, provided that p and q are not simultaneously 0. The present invention also relates to a liquid crystal composition containing dichroic dye(s) of formula (I) and/or formula (II), and to a liquid crystal element using the composition.

DETAILED DESCRIPTION OF THE INVENTION

Figure 1:
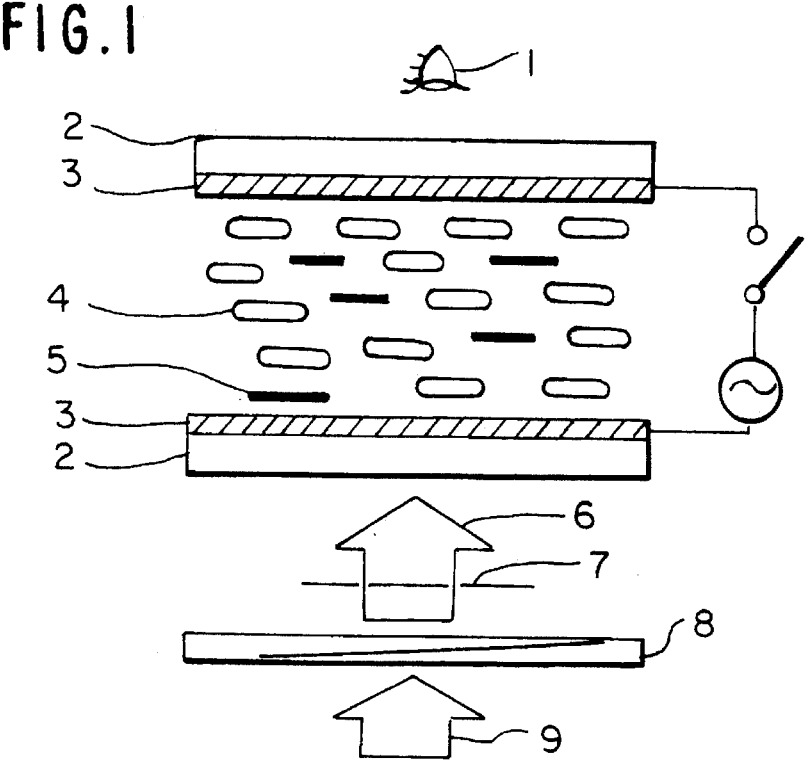
FIG. 1 is an illustrative cross section of a GH mode liquid crystal element with no voltage applied.

In formula (I), $R^1$ and $R^2$ each represents a hydrogen atom or a nonionic substituent.

The nonionic substituent as represented by $R^1$ or $R^2$ includes an alkyl group, an alkoxyalkyl group, an alkoxy group, an alkoxyalkoxy group,

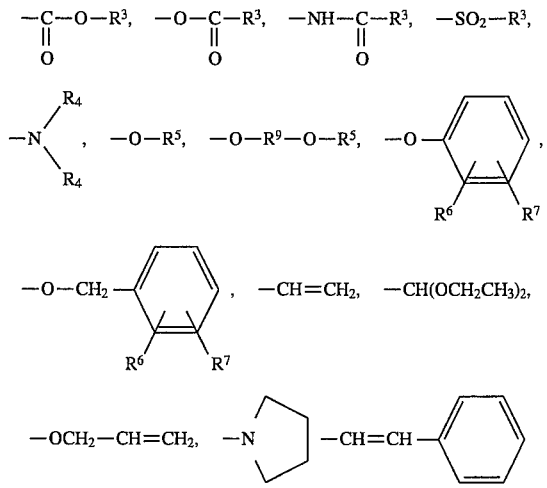

cyano group, a nitro group, a halogen atom, $-CF_3$, $-OCF_3$, $-OCF_2H$, $-OCF_2CF_2H$, and a phenyl or cyclohexyl group substituted with an alkyl group, an alkoxyalkyl group or an alkoxy group; wherein $R^3$ and $R^4$ represent an alkyl group; and $R^5$ represents an alkyl group having at least one halogen atom; and $R^6$ and $R^7$ each represent a hydrogen atom, a halogen atom, a methoxy group, a trifluoromethyl group, an alkyl group or a nitro group; and $R^9$ represents an alkylene group.

$R^1$ and $R^2$ each preferably represent a hydrogen atom, a halogen atom (e.g., F, Br and Cl), $-CF_3$, $-OCF_3$, $-OCF_2H$, $-OCF_2CF_2H$, and alkyl group, an alkoxyalkyl group, an alkoxy group,

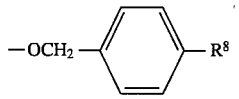

wherein $R^8$ is a hydrogen atom, a halogen atom, a trifluoromethyl group, a methoxy group, or an alkyl group), or a phenyl or cyclohexyl group substituted with an alkyl group, an alkoxyalkyl group or an alkoxy group, more preferably an alkyl group, an alkoxyalkyl group, an alkoxy group, the above-mentioned substituted of unsubstituted benzyloxy group or a phenyl group or cyclohexyl group substituted with an alkyl group, an alkoxyalkyl group or an alkoxy group.

Examples of these groups for $R^1$ and $R^2$ include alkyl groups having 1 to 18 carbon atoms, e.g., methyl, ethyl, and straight-chain or branched propyl, butyl, hexyl or octyl; alkoxyalkyl groups having 2 to 18 carbon atoms, e.g., ethoxymethyl, butoxymethyl, ethoxyethyl, and butoxyethyl; alkoxy groups having 1 to 18 carbon atoms, e.g., methoxy, ethoxy, and straight-chain or branched propoxy, butoxy or heptyloxy; benzyloxy, p-methoxybenzyloxy, p-trifluoromethylbenzyloxy, p-chlorobenzyloxy, p-fluorobenzyloxy, or p-$C_1$-$C_6$ alkyl (i.e., having 1 to 6 carbon atoms) substituted benzyloxy (e.g., p-methoylbenzyloxy nad p-t-butylbenzyloxy); alkyl-substituted phenyl groups, e.g., butyl-phenyl and hexylphenyl; alkoxyalkyl-substituted phenyl groups, e.g., ethoxymethylphenyl and butoxyethylphenyl; alkoxy-substituted phenyl groups, e.g., propoxyphenyl and hexyloxyphenyl; alkyl-substituted cyclohexyl groups, e.g., butylcyclohexyl and octylcyclohexyl; alkoxyalkyl-substituted cyclohexyl groups, e.g., butoxyethylcyclohexyl; and alkoxy-substituted cyclohexyl groups, e.g., pentoxycyclohexyl.

$X^1$ and $X^2$ represents

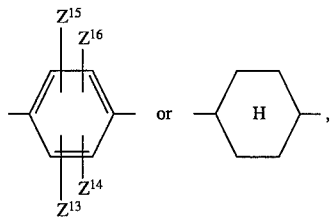

and preferably

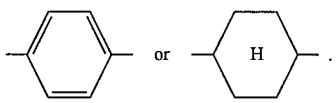

$Z^1, Z^2, Z^3, Z^4, Z^5, Z^6, Z^7, Z^8, Z^9, Z^{10}, Z^{11}, Z^{12}, Z^{13}, Z^{14}, Z^{15}$, and $Z^{16}$ each represent a hydrogen atom, a halogen atom, a methyl group or a methoxy group. $Z^3, Z^6, Z^9, Z^{12}, Z^{13}, Z^{14}, Z^{15}$, and $Z^{16}$ each preferably represent a hydrogen atom; $Z^1, Z^2, Z^4, Z^5, Z^7, Z^8, Z^{10}$ and $Z^{11}$ each preferably represent a hydrogen atom, a halogen atom, a methyl group or a methoxy group.

$Z^1$ and $Z^2$, $Z^4$ and $Z^5$, $Z^7$ and $Z^8$, $Z^{10}$ and $Z^{11}$, or $Z^{13}$ and $Z^{14}$ may be connected to each other to form an aliphatic ring (e.g., a part of a tetralin ring), an aromatic ring (e.g., a part of a naphthalene ring) or a nitrogen-containing aromatic ring (e.g., a part of a quinoline ring).

n and m each represent 0, 1 or 2. The sum of m and n is preferably 1 to 4. It is particularly preferred for synthesis and for practical use that m and n are both 1.

In formula (II), $R^{11}, R^{12}, R^{13}$, and $R^{14}$ each represent a hydrogen atom, an alkyl group, an alkoxyalkyl group, a substituted or unsubstituted aralkyl group or a fluoroalkyl-substituted alkyl group, provided that a compound in which $R^{11}$ is a hydrogen atom and $R^{12}$ is a substituted or unsubstituted aralkyl group and a compound in which $R^{13}$ is a hydrogen atom and $R^{14}$ is a substituted or unsubstituted aralkyl group are excluded.

$R^{11}$ and $R^{13}$ each preferably represent a hydrogen atom, a methyl group or an ethyl group, and $R^{12}$ and $R^{14}$ each preferably represent an alkyl group, an alkoxyalkyl group, a substituted or unsubstituted aralkyl group or a fluoroalkyl-substituted alkyl group.

Examples of preferred groups for to $R^{11}$ to $R^{14}$ include alkyl groups having 1 to 18 carbon atoms, e.g., methyl, ethyl, and straight-chain or branched propyl, butyl, hexyl, octyl, dodecyl, and octadecyl; alkoxyalkyl groups having 2 to 18 carbon atoms, e.g., ethoxymethyl, butoxymethyl, ethoxyethyl, and butoxyethyl; aralkyl groups which may be substituted with an alkyl group, an alkoxy group, a halogen atom, etc., e.g., benzyl, phenethyl, 4- butylbenzyl, 4- pentoxybenzyl, and 4- chlorobenzyl; and fluoroalkyl-substituted alkyl groups, e.g., perfluorobutylethyl and perfluorohexylethyl.

$R^{11}$ and $R^{12}$, or $R^{13}$ and $R^{14}$ may be connected to each other to form a nitrogen-containing aliphatic ring, such as a pyrrolidine ring, a piperidine ring or a morpholine ring.

$Z^{21}$, $Z^{22}$, $Z^{23}$, $Z^{24}$, $Z^{25}$, $Z^{26}$, $Z^{27}$, $Z^{28}$, $Z^{29}$, $Z^{30}$, $Z^{31}$, and $Z^{32}$ each represent a hydrogen atom, a halogen atom, a methyl group or a methoxy group. $Z^{21}$, $Z^{23}$, $Z^{26}$, $Z^{29}$, $Z^{30}$, and $Z^{32}$ each preferably represent a hydrogen atom; $Z^{22}$, $Z^{24}$, $Z^{25}$, $Z^{27}$, $Z^{28}$, and $Z^{31}$ each preferably represent a hydrogen atom, a halogen atom, e.g., a fluorine atom, a bromine atom or a chlorine atom, a methyl group or a methoxy group.

$Z^{21}$, and $Z^{22}$, $Z^{24}$ and $Z^{25}$, $Z^{27}$ and $Z^{28}$, or $Z^{30}$ and $Z^{31}$ may be connected to each other to form an aliphatic (e.g., a part of a tetralin ring), an aromatic ring (e.g., a part of a naphthalene ring) or a nitrogen-containing aromatic ring (e.g., a part of a quinoline ring).

$R^{11}$ and $Z^{23}$, $R^{12}$ and $Z^{21}$, $R^{13}$ and $Z^{32}$, or $R^{14}$ and $Z^{31}$ may be connected to each other to form a part of a nitrogen-containing aliphatic ring, such as a julolidine ring or a tetrahydroquinoline ring.

p and q each represent 0, 1 or 2, provided that p and q are not simultaneously 0. It is preferable for practical use that p and q are the same and 1 or 2.

The azo dyes according to the present invention, which has a trifluoromethyl-substituted biphenyl skeleton, can be obtained by a well-known diazo coupling reaction between 2,2'-ditrifluoromethylbenzidine represented by formula:

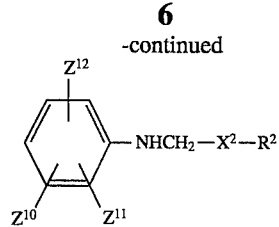

as a diazo component and an NH methylene type coupler or an aniline coupler.

While belonging to benzidine compounds known to be highly toxic, the 2,2'-ditrifluoromethylbenzidine to be used as a diazo component in the present invention is quite unique in that it has no mutagenicity.

In particular, the dichroic dye of formula (I) can be obtained by using at least one NH methylene type compound represented by formula (III) or (IV):

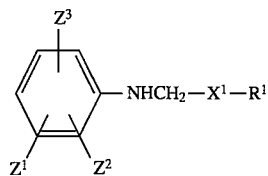

(III)

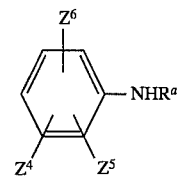

(IV)

wherein $R^1$, $R^2$, $X^1$, $X^2$, $Z^1$, $Z^2$, $Z^3$, $Z^{10}$, $Z^{11}$, and $Z^{12}$ are as defined above.

The diazo dyes of formula (I) may be prepared either by directly reacting 2,2'-ditrifluoromethylbenzidine and the coupler (III) and/or the coupler (IV) or, alternatively, first reacting 2,2'-ditrifluoromethylbenzidine with a compound of formula (V) and/or a compound of formula (VI):

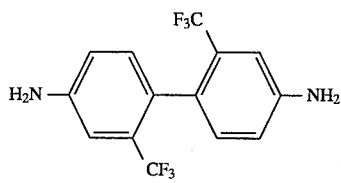

(V)

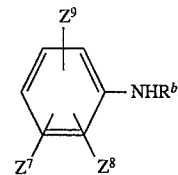

(VI)

wherein $Z^4$, $Z^5$, $Z^6$, $Z^7$, $Z^8$, and $Z^9$ are as defined above; and $R^a$ and $R^b$ each represent a hydrogen atom or —$CH_2SO_3Na$, according to a known diazo coupling reaction to once obtain a compound represented by formula (VII), (VIII) or (IX):

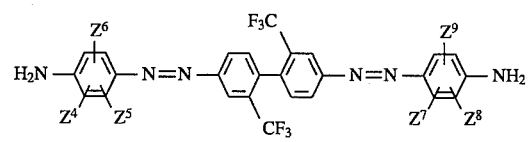

(VII)

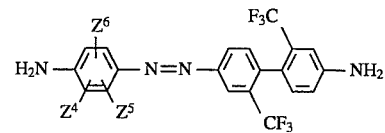

(VIII)

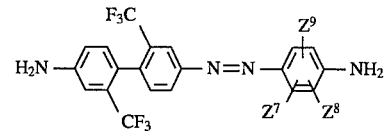

(IX)

wherein $Z^4$, $Z^5$, $Z^6$, $Z^7$, $Z^8$, and $Z^9$ are as defined above, and then reacting the compound (VII), (VIII) or (IX) with the compound (III) or (IV) according to a known diazo coupling reaction.

The liquid crystal composition according to the present invention can easily be prepared by mixing at least one of the above-mentioned dichroic azo dyes (I) and (II) with various known liquid crystal compounds showing a nematic or smectic phase, such as biphenyl type, phenylcyclohexane type, phenylpyrimidine type or cyclohexylcyclohexane type compounds, or a liquid crystal mixture comprising a plurality of these liquid crystal compounds. These liquid crystal compounds are described in Japan Society for the Promotion of Science, the 142nd Committee (ed.), *Ekisho Device Handbook*, pp. 154–192 & 715–722 (1989).

Examples of suitable liquid crystal compounds which can be used in the present invention are shown below.

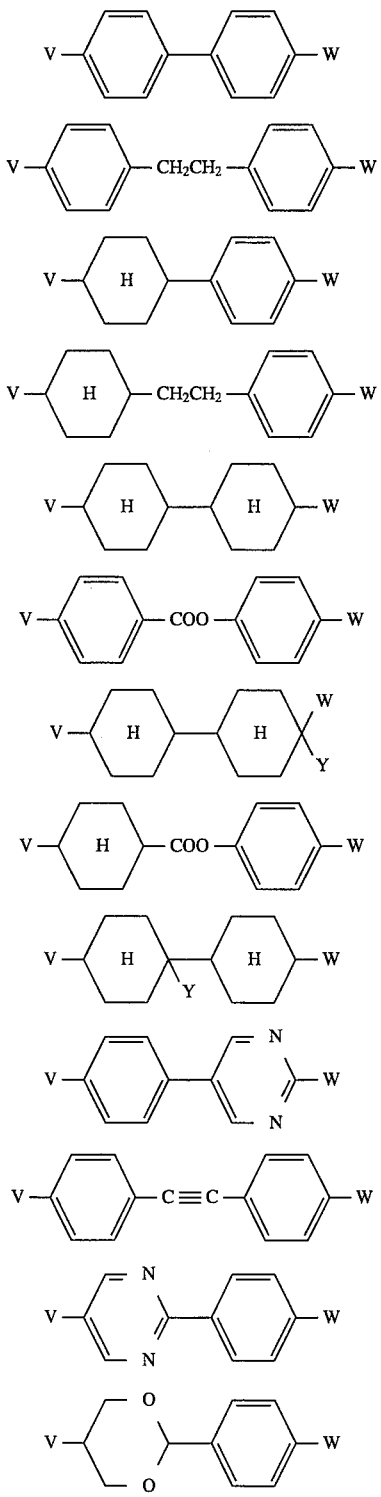

wherein V and W each represent an alkyl group, an alkoxy group, an alkoxyalkyl group, an alkylphenyl group, an alkoxyalkylphenyl group, an alkoxyphenyl, an alkylcyclohexyl group, an alkoxyalkylcyclohexyl group, an alkylcyclohexylphenyl group, a cyanophenyl group, a cyano group, a halogen atom, a fluoromethyl group, a fluoromethoxy group, an alkylphenylalkyl group, an alkoxyalkylphenylalkyl group, an alkylcyclohexylalkyl group, an alkoxyalkoxy- cyclohexylalkyl group, an alkoxyphenylalkyl group or an alkylcyclohexylphenylalkyl group; the alkyl or alkoxy moiety of V and W may contain an optically active center; Y represents a hydrogen atom, a halogen atom or a cyano group; the phenyl or phenoxy moiety of V and W may further be substituted with a cyano group or a halogen atom, e.g., a fluorine atom or a chlorine atom; the phenyl nuclei in the above structural formulae may further be substituted with 1 to 4 substituents selected from a halogen atom, e.g., a fluorine atom or a chlorine atom, and a cyano group.

In recent years, fluorine type liquid crystal compounds having a fluorine atom (—F) or a fluorine-containing group, e.g., —$CF_3$ or —$OCF_3$, have been used in liquid crystal displays using a thin film transistor (TFT.LCD) in place of conventional liquid crystal compounds containing a cyano group. The dichroic dyes of the present invention are also suited to these fluorine type liquid crystal compounds in terms of compatibility and the like.

The dichroic dye of the present invention is used in an amount usually of from 0.05 to 15% by weight, preferably from 0.5 to 5% by weight, based on the liquid crystal compound or liquid crystal mixture.

If desired, the liquid crystal composition of the present invention may contain optically active compounds which may or may not exhibit a liquid crystal phase, such as cholesteryl nonanoate. It may also contain various additives, such as ultraviolet absorbents, antioxidants, and so on.

The liquid crystal composition according to the present invention is sandwiched in between a pair of substrates each having an electrode, at least one of the substrates and the electrode formed thereon being transparent, to provide a liquid crystal element using guest-host effects (Sei-ichi Matsumoto and Ichiyoshi Tsunoda, *EKISHO NO SAISHIN GIJUTSU*, Vol. 34, Kogyo Chosakai Publishing Co., Ltd. (1983), and J. L. Fergason, *SID 85 Digest*, Vol. 68 (1985)).

The transparent substrate with a transparent electrode usually comprises a glass plate or a synthetic resin plate, such as a polycarbonate resin or an epoxy resin, on which an electrode layer comprising a metal oxide, such as indium oxide, indium-tin oxide (ITO), or tin oxide, is formed. The surface of the transparent electrode layer which is to come into contact with a liquid crystal composition is usually subjected to an orientation treatment. The orientation treatment is carried out by, for example, (1) coating with octadecyl-dimethyl[3-(trimethoxysilyl)propyl]ammonium chloride, hexadecyltrimethylammonium bromide, etc. to cause homeotropic orientation, (2) coating with polyimide to cause homogeneous orientation, (3) rubbing the surface with cotton cloth or absorbent cotton to cause homogeneous orientation, (4) vacuum evaporating SiO at an oblique angle to cause homogeneous orientation.

The two substrates are integrated into one body with their orientation-treated sides facing inside and with spacers therebetween so as to have a cell gap of 1 to 50 μm, preferably 1 to 15 μm to make a cell, and a liquid crystal composition is sealed into the cell.

Figure 2:
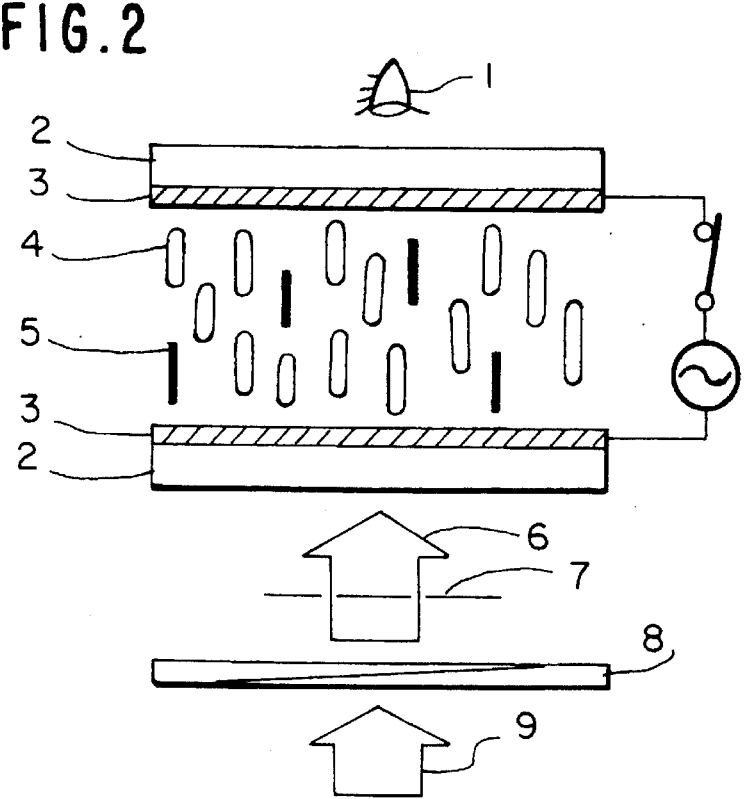
FIG. 2 is an illustrative cross section of a GH mode liquid crystal element with voltage applied.

An example of such a liquid crystal display element is shown in FIGS. 1 and 2. FIG. 1 shows the state with no voltage applied, while FIG. 2 shows the state with voltage applied. Numerals have the following meanings.

1 . . . Observer
2 . . . Transparent substrate
3 . . . Transparent electrode having been subjected to orientation treatment
4 . . . Nematic liquid crystal molecules having positive dielectric anisotropy
5 . . . Dichroic dye molecules 6 ... Polarized incident light
7 ... Direction of polarization of incident light
8 ... Polarizer
9 ... Incident light With no voltage applied, the major axes of the liquid crystal molecules and the dichroic dye molecules are in parallel with the substrate so that the element assumes a color. On application of voltage, the major axes of these molecules are vertically aligned to make the element colorless.

The present invention will now be illustrated in greater detail with reference to Examples, but it should be understood that the present invention is not construed as being limited thereto.

EXAMPLE 1

In a mixture of 2 ml of acetic acid, 0.8 ml of 35% hydrochloric acid, and 10 ml of water was dissolved 0.48 g of 2,2'-ditrifluoromethylbenzidine, and the solution was cooled to 0° to 5° C. To the solution was added 0.25 g of sodium nitrite while stirring. After the addition, the stirring was continued for an additional one hour at that temperature, and 0.07 g of sulfamic acid was added thereto to prepare a diazo solution.

Separately, 1.33 g of a coupling component of formula:

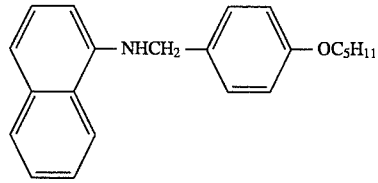

was dissolved in a mixture of 8 ml of N-methylpyrrolidone and 50 ml of methanol to prepare a coupler solution. The coupler solution was cooled to 0° to 5° C., and the diazo solution was slowly added thereto with stirring, followed by allowing the mixture to react at the same temperature for 2 hours.

After completion of the reaction, the reaction mixture was diluted with methanol at room temperature, and the precipitate was collected by filtration, washed with water and dried. Purification of the crude crystals by column chromatography was carried out to obtain an azo compound of formula:

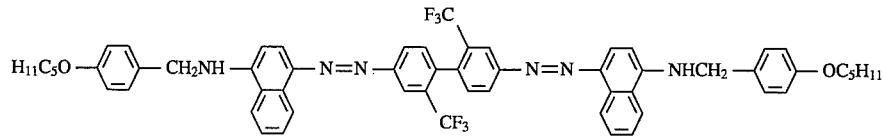

The resulting azo compound (hereinafter designated Compound No. 1) was dissolved in a commercially available fluorine type liquid crystal mixture ZLI-4792, produced by E. Merck & Co., in a concentration of 1% by weight to prepare a red-colored guest-host liquid crystal composition.

A liquid crystal cell having a cell gap of 9 μm was assembled using a pair of glass substrates each having a transparent electrode on which a polyimide resin had been applied, cured, and rubbed to form an orientation film for homogeneous orientation. The above prepared liquid crystal composition was sealed into the cell.

Absorbance (A//) of the red-colored cell for linear polarized light parallel to the direction of orientation of the liquid crystal molecules and absorbance (A⊥) for linear polarized light vertical to the direction of orientation were measured, and an order parameter (S) at the maximum absorbing wavelength ($\lambda_{max}$: 484 nm) was calculated from equation:

$$S=(A//-A\perp)/(A//+2A\perp)$$

As a result, S was found to be 0.81.

EXAMPLE 2

An azo compound (designated Compound No. 2) represented by formula:

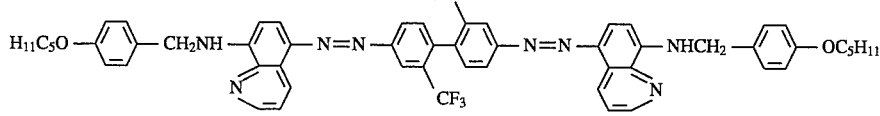

was obtained in the same manner as in Example 1, except for using a coupler of formula:

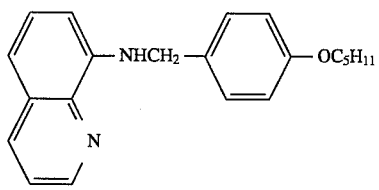

A red-colored liquid crystal cell was prepared in the same manner as in Example 1, except for using Compound No. 2. The order parameter S of the cell was 0.80 ($\lambda_{max}$: 493 nm).

EXAMPLE 3

In a mixture of 16 ml of acetic acid, 5.3 ml of 35% hydrochloric acid, and 50 ml of water was dissolved 3.20 g of 2,2'-ditrifluoromethylbenzidine, and the solution was cooled to 0° to 5° C. To the solution was added 1.52 g of sodium nitrite while stirring. After the addition, the stirring was continued for an additional one hour at that temperature, and 0.20 g of sulfamic acid was added thereto to prepare a diazo solution.

Separately, 4.60 g of a coupling component of formula:

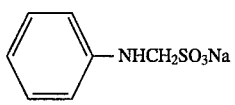

was dissolved in 40 ml of water, followed by cooling to 0° to 5° C. A sodium hydroxide aqueous solution was added thereto with stirring to adjust to a pH of 2 to 3, and the diazo solution was added thereto, followed by allowing the mixture to react at the same temperature for 2 hours. After completion of the coupling reaction, the reaction mixture was made alkaline by addition of sodium hydroxide and heated at 50° C. for 3 hours for hydrolysis. After cooling, the precipitate was collected by filtration, washed with water and dried. Purification of the crude crystals by column chromatography gave an azo compound of formula:

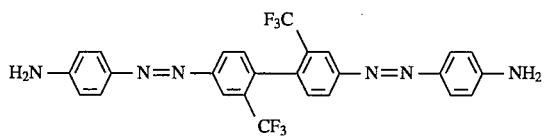

In a mixture of 16 ml of acetic acid and 6 ml of propionic acid was dissolved 0.35 g of the resulting azo compound, and the solution was cooled to 0° to 5° C. To the solution was added 0.18 g of 43% nitrosyl sulfate while stirring, and the stirring was continued for one hour to prepare a diazo solution.

Separately, 0.62 g of a coupling component of formula:

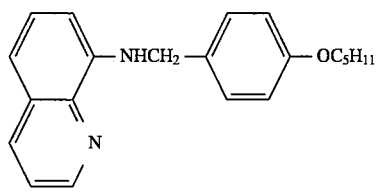

and 20 mg of urea were dissolved in a mixture of 2 mg of N-methylpyrrolidone and 50 ml of methanol to prepare a coupler solution. The coupler solution was cooled to 0° to 5° C., and the diazo solution was added thereto with stirring, followed by allowing the mixture to react at the same temperature for 2 hours. The precipitate was collected by filtration, washed with water and dried. The resulting crude crystals were purified by column chromatography to obtain an azo compound (designated Compound No. 3) represented by formula:

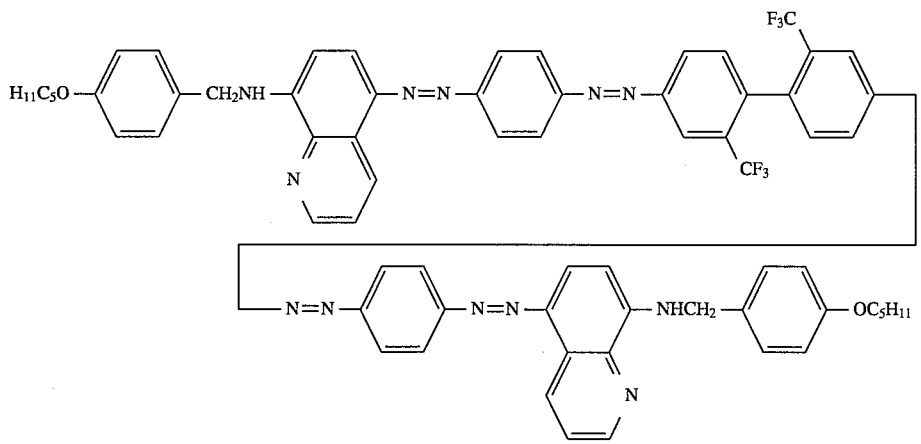

A colored liquid crystal cell was prepared in the same manner as in Example 1, except for using Compound No. 3. The order parameter S of the cell was 0.78 ($\lambda_{max}$: 535 nm).

REFERENCE EXAMPLE

An azo dye represented by formula:

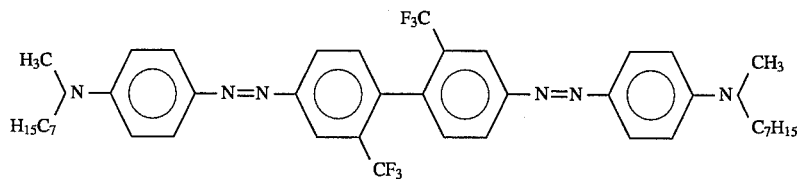

was prepared in the same manner as in Example 1, except for using a dialkylaniline type coupling component of formula:

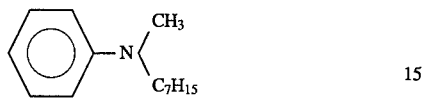

A liquid crystal composition comprising the resulting azo dye and a phenylcyclohexane type liquid crystal mixture ZLI-1565, produced by E. Merck, had a hue of vermilion and an order parameter (S) of 0.69, indicating low dichroism.

EXAMPLE 4

Various azo compounds were synthesized in the same manner as in Examples 1 to 3 and each mixed with a phenylcyclohexane type liquid crystal mixture ZLI-1565. The hue and the order parameter (S) of the liquid crystal composition are shown in Table 2. The results of Examples 1 to 3 and Reference Example are also shown in the Table.

TABLE 2

| Compound No. | Structure | S | Hue |
|---|---|---|---|
| 1 | | 0.81 | vermilion |
| 2 | | 0.80 | vermilion |
| 3 | | 0.78 | reddish purple |
| 4 | | 0.79 | vermilion |
| 5 | | 0.78 | red |
| 6 | | 0.75 | vermilion |

TABLE 2-continued

| Compound No. | Structure | S | Hue |
|---|---|---|---|
| 7 | | 0.79 | red |
| 8 | | 0.77 | vermilion |
| 9 | | 0.78 | red |
| 10 | | 0.75 | reddish purple |
| 11 | | 0.73 | red |
| 12 | | 0.78 | reddish purple |
| 13 | | 0.76 | vermilion |

TABLE 2-continued

| Compound No. | Structure | S | Hue |
|---|---|---|---|
| 14 | | 0.76 | red |
| 15 | | 0.74 | vermilion |
| 16 | | 0.78 | vermilion |
| 17 | | 0.81 | reddish purple |
| 18 | | 0.82 | reddish purple |
| 19 | | 0.83 | reddish purple |

TABLE 2-continued

| Compound No. | Structure | S | Hue |
|---|---|---|---|
| 20 | | 0.82 | reddish purple |
| 21 | | 0.78 | red |
| 22 | | 0.80 | vermilion |
| 23 | | 0.78 | red |
| 24 | | 0.81 | reddish purple |
| 25 | | 0.79 | reddish purple |
| 26 | | 0.82 | blue |

TABLE 2-continued

| Compound No. | Structure | S | Hue |
|---|---|---|---|
| Reference Example | (n)H₁₅C₇\N(CH₃)-C₆H₄-N=N-C₆H₂(CF₃)(CF₃)-N=N-C₆H₄-N(CH₃)/C₇H₁₅(n) | 0.69 | vermilion |

EXAMPLE 5

The order parameter (S) of each of Compound Nos. 1 to 3 and 17 to 19 of Table 2 in a substituted phenylcyclohexane type liquid crystal mixture ZLI-1132, produced by E. Merck, (equivalent to TNC-1132), is shown in Table 3.

TABLE 3

| Compound No. | S | $\lambda_{max}$ (nm) |
| --- | --- | --- |
| 1 | 0.80 | 511 |
| 2 | 0.75 | 499 |
| 3 | 0.80 | 542 |
| 17 | 0.79 | 542 |
| 18 | 0.81 | 554 |
| 19 | 0.80 | 542 |

The order parameter (S) of Compound No. 17 or 18 in a fluorine type liquid crystal mixture ZLI-4792 was 0.82 ($\lambda_{max}$: 532 nm) or 0.82 ($\lambda_{max}$: 530 nm), respectively.

EXAMPLE 6

In a mixture of 16 ml of acetic acid, 5.3 ml of 35% hydrochloric acid, and 10 ml of water was dissolved 3.20 g of 2,2'-ditrifluoromethylbenzidine, and the solution was cooled to 0° to 5° C. To the solution was added 1.52 g of sodium nitrite while stirring. After the addition, the stirring was continued for an additional one hour at that temperature, and 0.20 g of sulfamic acid was added thereto to prepare a diazo solution.

Separately, 4.60 g of a coupling component of formula:

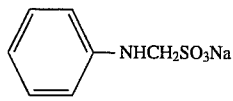

was dissolved in 40 ml of water, followed by cooling to 0° to 5° C. A sodium hydroxide aqueous solution was added thereto with stirring to adjust to a pH of 2 to 3, and the above diazo solution was added thereto while stirring, followed by allowing the mixture to react at the same temperature for 2 hours.

After completion of the coupling reaction, the reaction mixture was made alkaline by addition of sodium hydroxide and heated at 50° C. for 3 hours for hydrolysis. After cooling, the precipitate was collected by filtration, washed with water and dried. Purification of the crude crystals by column chromatography gave an azo compound of formula:

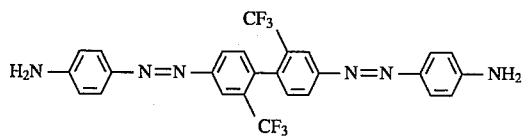

In 10 ml of dimethylformamide was dissolved 0.48 g of the resulting azo compound, and 0.5 ml of 35% hydrochloric acid was added to the solution. After cooling the solution to 0° to 5° C., an aqueous solution containing 0.15 g of sodium sulfite was added thereto while stirring, and the stirring was continued for one hour to prepare a diazo solution.

Separately, 0.36 g of a coupling component of formula:

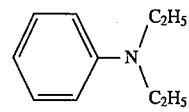

and 50 mg of urea were dissolved in 50 ml of methanol, and the resulting coupler solution was cooled to 0° to 5° C. The diazo solution was added thereto with stirring, followed by allowing the mixture to react at the same temperature for 2 hours. The precipitate was collected by filtration, washed with water and dried. The resulting crude crystals were purified by column chromatography to obtain an azo compound represented by formula:

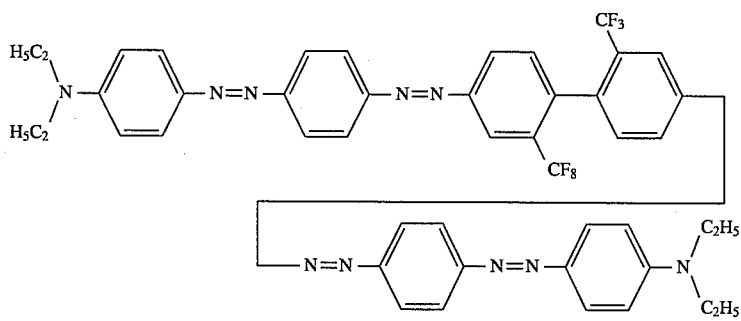

The thus obtained azo compound was dissolved in a phenylcyclohexane type liquid crystal mixture ZLI-1565 in a concentration of 1% by weight to prepare a red-colored guest-host liquid crystal composition. A liquid crystal cell was prepared using the liquid crystal composition in the same manner as in Example 1. The order parameter S of the cell was 0.82 ($\lambda_{max}$: 524 nm).

The order parameter of the same azo compound in a fluorine type liquid crystal mixture ZLI-4792 was 0.83 ($\lambda_{max}$: 514 nm).

EXAMPLE 7

Various azo compounds were synthesized in the same manner as in Example 6 and each mixed with a phenylcyclohexane type liquid crystal mixture ZLI-1565. The hue and the order parameter (S) of the liquid crystal composition are shown in Table 4.

TABLE 4

| Compound No. | Structure | S | Hue |
|---|---|---|---|
| 27 | | 0.80 | red |
| 28 | | 0.78 | reddish purple |
| 29 | | 0.76 | red |
| 30 | | 0.78 | purple |

TABLE 4-continued

| Compound No. | Structure | S | Hue |
|---|---|---|---|
| 31 | | 0.78 | reddish purple |
| 32 | | 0.78 | purple |
| 33 | | 0.74 | red |
| 34 | | 0.77 | reddish purple |

TABLE 4-continued

| Compound No. | Structure | S | Hue |
|---|---|---|---|
| 35 | (structure) | 0.77 | red |
| 36 | (structure) | 0.75 | red |
| 37 | (structure) | 0.72 | red |
| 38 | (structure) | 0.74 | red |
| 39 | (structure) | 0.73 | red |

TABLE 4-continued

| Compound No. | Structure | S | Hue |
|---|---|---|---|
| 40 | (n)C₃H₇,(n)C₃H₇-N-C₆H₃(F)-N=N-C₆H₃(CF₃)-C₆H₃(CF₃)-N=N-C₆H₄-N=N-C₆H₃(F)-N(C₃H₇(n))(C₃F₇(n)) | 0.73 | red |
| 41 | (n)C₈H₁₇,CH₃-N-C₆H₄-N=N-C₆H₃(CF₃)-C₆H₃(CF₃)-N=N-C₆H₄-N(CH₃)(C₈H₁₇(n)) | 0.75 | red |
| 42 | tetralin-fused structure with CF₃ biphenyl and C₅H₁₁(n) amine groups | 0.78 | red |
| 43 | tetralin-fused structure with CF₃ biphenyl and C₈H₁₇(n) amine groups | 0.78 | red |

The present invention provides dichroic dyes having high dichroism and high coloring power. Liquid crystal compositions containing these dichroic dyes provide guest-host liquid crystal elements, such as liquid crystal displays, excellent in display contrast and other performances.

While the invention has been described in detail and with reference to specific examples thereof, it will be apparent to one skilled in the art that various changes and modifications can be made therein without departing from the spirit and scope thereof.

What is claimed is:

1. A dichroic dye represented by formula (I):

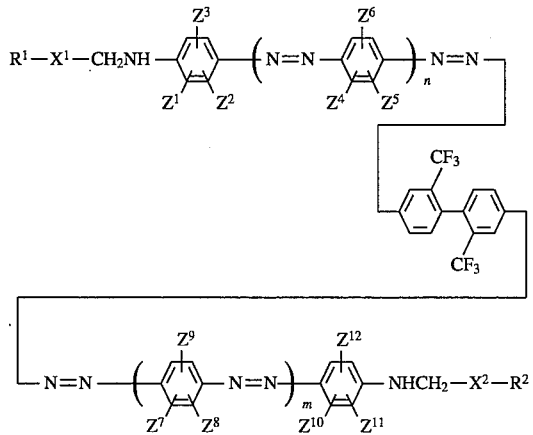

wherein $R^1$ and $R^2$ each represent a hydrogen atom or a nonionic substituent; $X^1$ and $X^2$ each represent

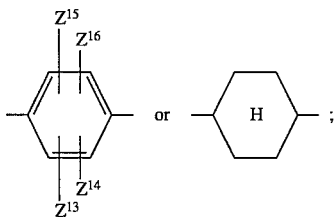

$Z^1, Z^2, Z^3, Z^4, Z^5, Z^6, Z^7, Z^8, Z^9, Z^{10}, Z^{11}, Z^{12}, Z^{13}, Z^{14}, Z^{15}$, and $Z^{16}$ each represent a hydrogen atom, a halogen atom, a methyl group or a methoxy group; $Z^1$ and $Z^2$, $Z^4$ and $Z^5$, $Z^7$ and $Z^8$, $Z^{10}$ and $Z^{11}$, or $Z^{13}$ and $Z^{14}$ may be connected to each other to form an aliphatic, aromatic or nitrogen-containing aromatic ring; and n and m each represent 0, 1 or 2, or formula (II):

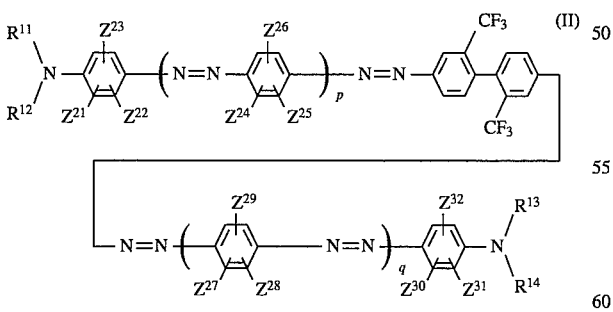

wherein $R^{11}$, $R^{12}$, $R^{13}$, and $R^{14}$ each represent a hydrogen atom, an alkyl group, an alkoxyalkyl group, a substituted or unsubstituted aralkyl group or a fluoroalkyl-substituted alkyl group, provided that a compound in which $R^{11}$ is a hydrogen atom and $R^{12}$ is a substituted or unsubstituted aralkyl group and a compound in which $R^{13}$ is a hydrogen atom and $R^{14}$ is a substituted or unsubstituted aralkyl group are excluded; $R^{11}$ and $R^{12}$, or $R^{13}$ and $R^{14}$ may be connected to each other to form a nitrogen-containing aliphatic ring; $Z^{21}, Z^{22}, Z^{23}, Z^{24}, Z^{25}, Z^{26}, Z^{27}, Z^{28}, Z^{29}, Z^{30}, Z^{31}$, and $Z^{32}$ each represent a hydrogen atom, a halogen atom, a methyl group or a methoxy group; $Z^{21}$ and $Z^{22}$, $Z^{24}$ and $Z^{25}$, $Z^{27}$ and $Z^{28}$, and $Z^{31}$ may be connected to each other to form an aliphatic, aromatic or nitrogen-containing aromatic ring; $R^{11}$ and $Z^{23}$, $R^{12}$ and $Z^{21}$, $R^{13}$ and $Z^{32}$, or $R^{14}$ and $Z^{31}$ may be connected to each other to form a nitrogen-containing aliphatic ring; and p and q each represent 0, 1 or 2, provided that p and q are not simultaneously 0.

2. A dichroic dye as claimed in claim 1, wherein $R^1$ and $R^2$ each represent a hydrogen atom, a halogen atom, —$CF_3$, —$OCF_3$, —$OCF_2H$, —$OCF_2CF_2H$, an alkyl group, an alkoxyalkyl group, an alkoxy group,

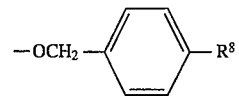

(wherein $R^8$ represents a hydrogen atom, a halogen atom, trifluoromethyl group, methoxy group or an alkyl group), or a phenyl or cyclohexyl group substituted with an alkyl group, an alkoxyalkyl group or an alkoxy group; $X^1$ and $X^2$ represents

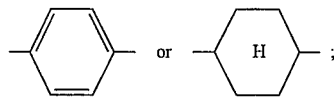

$Z^3, Z^6, Z^9, Z^{12}$, each represent a hydrogen atom; $Z^1, Z^2, Z^4, Z^5, Z^7, Z^8, Z^{10}$, and $Z^{11}$ each represent a hydrogen atom, a halogen atom, a methyl group or a methoxy group; $Z^1$, and $Z^2$, $Z^4$, and $Z^5$, $Z^7$, and $Z^8$, or $Z^{10}$, and $Z^{11}$, may be connected to each other to form an aliphatic ring, an aromatic ring or a nitrogen-containing aromatic ring; and n and m each represent 0, 1 or 2.

3. A dichroic dye as claimed in claim 1, wherein $R^1$ and $R^2$, each represent an alkyl group, an alkoxyalkyl group, an alkoxy group, or a phenyl or cyclohexyl group substituted with an alkyl group, an alkoxyalkyl group or an alkoxy group;

$X^1$ and $X^2$ represents

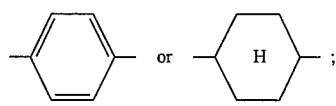

$Z^3, Z^6, Z^9, Z^{12}$, each represent a hydrogen atom; $Z^1, Z^2, Z^4, Z^5, Z^7, Z^8, Z^{10}$ and $Z^{11}$, each represent a hydrogen atom, a halogen atom, a methyl group or a methoxy group; $Z^1$, and $Z^2$, $Z^4$ and $Z^5$, $Z^7$, and $Z^8$, or $Z^{10}$ and $Z^{11}$ may be connected to each other to form an aliphatic ring, an aromatic ring or a nitrogen-containing aromatic ring; and n and m each represent 0, 1, or 2.

4. A dichroic dye as claimed in claim 1, wherein the sum of m and n is from 1 to 4.

5. A dichroic dye as claimed in claim 2, wherein the sum of m and n is from 1 to 4.

6. A dichroic dye as claimed in claim 3, wherein the sum of m and n is from 1 to 4.

7. A dichroic dye as claimed in claim 1, wherein $R^{11}$ and $R^{13}$, each represent a hydrogen atom, a methyl group or an ethyl group; $R^{12}$, and $R^{14}$, each represent an alkyl group, an alkoxyalkyl group, a substituted or unsubstituted aralkyl group or a fluoroalkyl-substituted alkyl group; provided that a compound in which $R^{11}$, is a hydrogen atom and $R^{12}$, is a substituted or unsubstituted aralkyl group and a compound in which $R^{13}$, is a hydrogen atom and $R^{14}$, is a substituted or unsubstituted aralkyl group are excluded; $Z^{22}$, $Z^{24}$, $Z^{25}$, $Z^{27}Z^{28}$, and $Z^{31}$, each represent a hydrogen atom, a halogen atom, a methyl group or a methoxy group; $Z^{21}$, $Z^{23}$, $Z^{26}$, $Z^{29}$, $Z^{30}$, and $Z^{32}$ each represent a hydrogen atom; $Z^{24}$, and $Z^{25}$, and $Z^{27}$, and $Z^{28}$, may be connected to each other to form an alipathic ring, an aromatic ring or a nitrogen-containing aromatic ring; and p and q each represent 0, 1, or 2, provided that p and q are not simultaneously 0.

8. A liquid crystal composition containing at least one liquid crystal compound and at least one dichroic dye selected from the group consisting of a compound represented by formula (I):

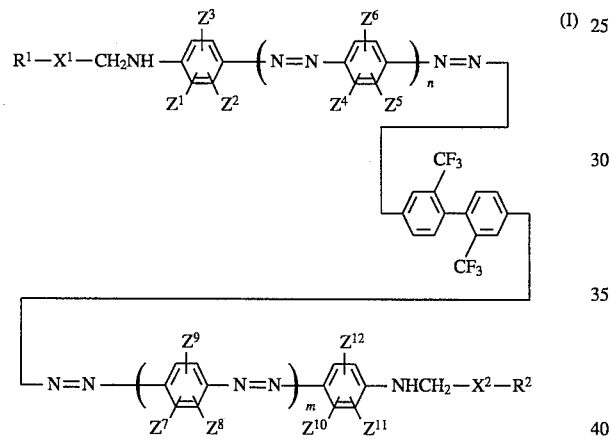

wherein $R^1$, and $R^2$, each represent a hydrogen atom or a nonionic substituent; $X^1$, and $X^2$, each represent

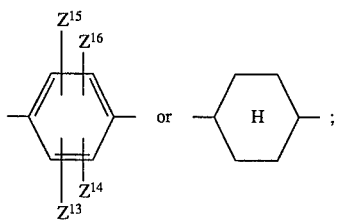

$Z^1$, $Z^2$, $Z^3$, $Z^4$, $Z^5$, $Z^6$, $Z^7$, $Z^8$, $Z^9$, $Z^{10}$, $Z^{11}$, $Z^{12}$, $Z^{13}$, $Z^{14}$, $Z^{15}$, and $Z^{16}$ each represent a hydrogen atom, a halogen atom, a methyl group or a methoxy group; $Z^1$, and $Z^2$, $Z^4$ and $Z^5$, $Z^7$, and $Z^8$, $Z^{10}$, and $Z^{11}$, or $Z^{13}$ and $Z^{14}$ may be connected to each other to form an aliphatic, aromatic or nitrogen-containing aromatic ring; and n and m each represent 0, 1, or 2, and a compound represented by formula (II):

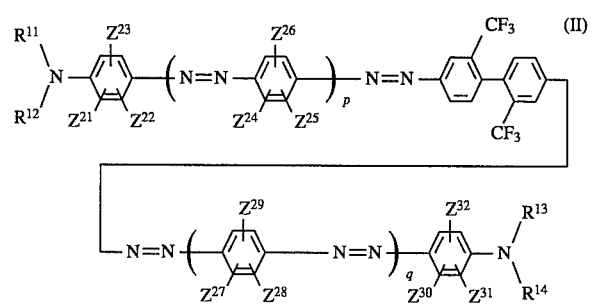

wherein $R^{11}$, $R^{12}$, $R^{13}$, and $R^{14}$, each represent a hydrogen atom, an alkyl group, an alkoxyalkyl group, a substituted or unsubstituted aralkyl group or a fluoroalkyl-substituted alkyl group, provided that a compound in which $R^{11}$ is a hydrogen atom and $R^{12}$ is a substituted or unsubstituted aralkyl group and a compound in which $R^{13}$ is a hydrogen atom and $R^{14}$ is a substituted or unsubstituted aralkyl group are excluded; $R^{11}$ and $R^{12}$, or $R^{13}$ and $R^{14}$ may be connected to each other to form a nitrogen-containing aliphatic ring; $Z^{21}$, $Z^{22}$, $Z^{23}$, $Z^{24}$, $Z^{25}$, $Z^{26}$, $Z^{27}$, $Z^{28}$, $Z^{29}$, $Z^{30}$, $Z^{31}$, and $Z^{32}$ each represent a hydrogen atom, a halogen atom, a methyl group or a methoxy group; $Z^{21}$, and $Z^{22}$, $Z^{24}$, and $Z^{25}$, $Z^{27}$and $Z^{28}$, or $Z^{30}$ and $Z^{31}$, may be connected to each other to form an aliphatic, aromatic or nitrogen-containing aromatic ring; $R^{11}$, and $Z^{23}$, $R^{12}$, and $Z^{21}$, $R^{13}$ and $Z^{32}$, or $R^{14}$, and $Z^{31}$, may be connected to each other to form a nitrogen-containing aliphatic ring; and p and q each represent 0, 1, or 2, provided that p and q are not simultaneously 0.

9. A liquid crystal composition as claimed in claim 8, wherein $R^1$ and $R^2$ each represent a hydrogen atom, a halogen atom, —$CF_3$, —$OCF_3$, —$OCF_2H$,, —$OCF_2CF_2H$, an alkyl group, an alkoxyalkyl group, an alkoxy group,

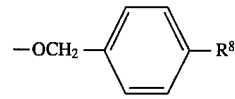

(wherein $R^8$ represents a hydrogen atom, a halogen atom, trifluoromethyl group, methoxy group or an alkyl group), or a phenyl or cyclohexyl group substituted with an alkyl group, an alkoxyalkyl group or an alkoxy group; $X^1$ and $X^2$ represents

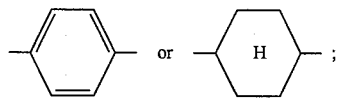

$Z^1$, $Z^2$, $Z^4$, $Z^5$, $Z^7$, $Z^8$, $Z^{10}$, and $Z^{11}$ each represent a hydrogen atom, a halogen atom, a methyl group or a methoxy group; $Z^3$, $Z^6$, $Z^9$, and $Z^{12}$ each represent a hydrogen atom; $Z^1$, and $Z^2$, $Z^4$, and $Z^5$, $Z^7$ and $Z^8$, or $Z^{10}$ and $Z^{11}$ may be connected to each other to form an aliphatic ring, an aromatic ring or a nitrogen-containing aromatic ring; and n and m each represent 0, 1, or 2.

10. A liquid crystal composition as claimed in claim 8, wherein $R^1$ and $R^2$ each represent an alkyl group, an alkoxyalkyl group, an alkoxy group or a phenyl or cyclohexyl group substituted with an alkyl group, an alkoxyalkyl group or an alkoxy group; $X^1$ and $X^2$ represents

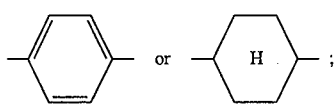

$Z^1$, $Z^2$, $Z^4$, $Z^5$, $Z^7$, $Z^8$, $Z^{10}$, and $Z^{11}$ each represent a hydrogen atom, a halogen atom, a methyl group or a methoxy group; $Z^3$, $Z^6$, $Z^9$, and $Z^{12}$, each represent a hydrogen atom; $Z^1$, and $Z^2$, $Z^4$ and $Z^5$, $Z^7$ and $Z^8$, or $Z^{10}$, and $Z^{11}$ may be connected to each other to form an aliphatic ring, an aromatic ring or a nitrogen-containing aromatic ring; and n and m each represent 0, 1, or 2.

11. A liquid crystal composition as claimed in claim 8, wherein the sum of m and n is from 1 to 4.

12. A liquid crystal composition as claimed in claim 9, wherein the sum of m and n is from 1 to 4.

13. A liquid crystal composition as claimed in claim 10, wherein the sum of m and n is from 1 to 4.

14. A liquid crystal composition as claimed in claim 8, wherein $R^{11}$, and $R^{13}$, each represent a hydrogen atom, a methyl group or an ethyl group; $R^{12}$ and $R^{14}$ each represent an alkyl group, an alkoxyalkyl group, a substituted or unsubstituted aralkyl group or a fluoroalkyl-substituted alkyl group; provided that a compound in which $R^{11}$ is a hydrogen atom and $R^{12}$ is a substituted or unsubstituted aralkyl group and a compound in which $R^{13}$ is a hydrogen atom and $R^{14}$ is a substituted or unsubstituted aralkyl group are excluded; $Z^{22}$, $Z^{24}$, $Z^{25}$, $Z^{27}$, $Z^{28}$, and $Z^{31}$ each represent a hydrogen atom, a halogen atom, a methyl group or a methoxy group; $Z^{21}$, $Z^{23}$, $Z^{26}$, $Z^{29}$, $Z^{30}$, and $Z^{32}$ each represent a hydrogen atom; $Z^{24}$ and $Z^{25}$, and $Z^{27}$ and $Z^{28}$ may be connected to each other to form an aliphatic ring, an aromatic ring or a nitrogen-containing aromatic ring, and p and q each represent 0, 1, or 2, provided that p and q are not simultaneously 0.

15. A liquid crystal composition as claimed in claim 8, wherein said liquid crystal compound is a liquid crystal compound having a fluorine atom or a fluorine-containing group.

16. A liquid crystal composition as claimed in claim 8, wherein said dichroic dye is present in an amount of from 0.05, to 15% by weight.

17. A liquid crystal element using a liquid crystal composition containing at least one liquid crystal compound and at least one dichroic dye selected from the group consisting of a compound represented by formula (I):

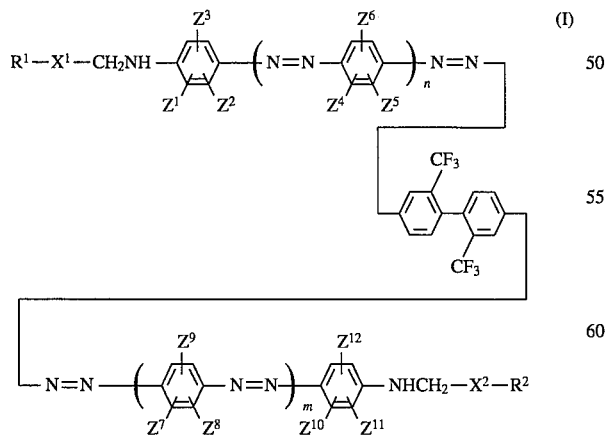

wherein $R^1$ and $R^2$ each represent a hydrogen atom or a nonionic substituent; $X^1$ and $X^2$ each represent

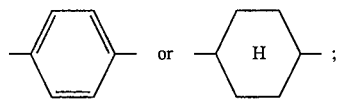

$Z^1$, $Z^2$, $Z^3$, $Z^4$, $Z^5$, $Z^6$, $Z^7$, $Z^8$, $Z^9$, $Z^{10}$, $Z^{11}$, $Z^{12}$, $Z^{13}$, $Z^{14}$, $Z^{15}$, and $Z^{16}$ each represent a hydrogen atom, a halogen atom, a methyl group or a methoxy group; $Z^1$, and $Z^2$, $Z^4$, and $Z^5$, $Z^7$, and $Z^8$, $Z^{10}$ and $Z^{11}$, or $Z^{13}$ and $Z^{14}$ may be connected to each other to form an aliphatic, aromatic or nitrogen-containing aromatic ring; and n and m each represent 0, 1, or 2, and a compound represented by formula (II):

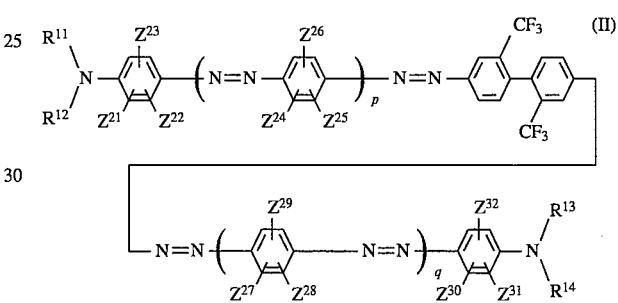

wherein $R^{11}$, $R^{12}$, $R^{13}$, and $R^{14}$, each represent a hydrogen atom, an alkyl group, an alkoxyalkyl group, a substituted or unsubstituted aralkyl group or a fluoroalkyl-substituted alkyl group, provided that a compound in which $R^{11}$, is a hydrogen atom and $R^{12}$ is a substituted or unsubstituted aralkyl group and a compound in which $R^{13}$ is a hydrogen atom and $R^{14}$ is a substituted or unsubstituted aralkyl group are excluded; $R^{11}$, and $R^{12}$, or $R^{13}$ and $R^{14}$ may be connected to each other to form a nitrogen-containing aliphatic ring; $Z^{21}$, $Z^{22}$, $Z^{23}$, $Z^{24}$, $Z^{25}$, $Z^{26}$, $Z^{27}$, $Z^{28}$, $Z^{29}$, $Z^{30}$, $Z^{31}$, and $Z^{32}$ each represent a hydrogen atom, a halogen atom, a methyl group or a methoxy group; $Z^{21}$, and $Z^{22}$, $Z^{24}$, and $Z^{25}$, $Z^{27}$ and $Z^{28}$, or $Z^{30}$, and $Z^{31}$ may be connected to each other to form an aliphatic, aromatic or nitrogen-containing aromatic ring; $R^{11}$, and $Z^{23}$, $R^{12}$, and $Z^{21}$, $R^{13}$ and $Z^{32}$, or $R^{14}$ and $Z^{31}$ may be connected to each other to form a nitrogen-containing aliphatic ring; and p and q each represent 0, 1, or 2, provided that p and q are not simultaneously 0.

* * * * *